(12) United States Patent
Klintenstedt et al.

(10) Patent No.: US 6,578,670 B1
(45) Date of Patent: Jun. 17, 2003

(54) DRIVE UNIT FOR CENTRIFUGE ROTOR OF A CENTRIFUGAL SEPARATOR

(75) Inventors: Kjell Klintenstedt, Saltsjö-Boo (SE); Torbjörn Larsen, Uttran (SE); Jan Setterberg, Huddinge (SE); Stefan Szepessy, Stockholm (SE)

(73) Assignee: Alfa Laval AB, Tumba (SE)

( * ) Notice: Subject to any disclaimer, the term of this patent is extended or adjusted under 35 U.S.C. 154(b) by 17 days.

(21) Appl. No.: 09/889,479

(22) PCT Filed: Aug. 3, 2000

(86) PCT No.: PCT/SE00/00460

§ 371 (c)(1),
(2), (4) Date: Jul. 16, 2001

(87) PCT Pub. No.: WO00/53332

PCT Pub. Date: Sep. 14, 2000

(30) Foreign Application Priority Data

Mar. 8, 1999 (SE) ............................................. 9900817

(51) Int. Cl.[7] ................................................. F01M 1/00
(52) U.S. Cl. ...................... 184/6.16; 184/6.26; 384/465
(58) Field of Search ................... 384/465, 606; 184/6.16, 6.18, 6.22, 6.26

(56) References Cited

U.S. PATENT DOCUMENTS

| 3,659,674 | A | * | 5/1972 | Ferrario | ..................... 184/6.16 |
|---|---|---|---|---|---|
| 3,664,461 | A | * | 5/1972 | Leffers et al. | ............. 184/6.16 |
| 4,209,080 | A | * | 6/1980 | Douglas | ..................... 184/6.16 |
| 4,375,944 | A | * | 3/1983 | Wolf | .......................... 184/6.16 |
| 4,541,736 | A | | 9/1985 | Giebeler, Jr. | |
| 4,834,627 | A | * | 5/1989 | Gannaway | ................. 184/6.16 |
| 5,941,346 | A | * | 8/1999 | Oh | .............................. 184/32 |

FOREIGN PATENT DOCUMENTS

EP  0756897  2/1997

* cited by examiner

Primary Examiner—David Fenstermacher
(74) Attorney, Agent, or Firm—McCormick, Paulding & Huber LLP

(57) ABSTRACT

The invention refers to a drive unit (1) for a centrifuge rotor (2) of a centrifugal separator. The drive unit (1) includes a drive shaft (3), which is arranged to support said centrifuge rotor (2) and is rotatably journalled around an axis (z) of rotation, a casing (6), which forms an inner space for the drive shaft (3), and a drive motor shaft (9), which is provided outside the casing (6) and connected to the drive shaft (3) by means of a transferring member (11) which extends through a passage (12) in the casing (6). A shielding member (23) is provided inside the casing (6) in such a way that the part of the transferring member (11), which is located inside the casing (6) is shielded from the inner space, wherein the shielding member (23) forms a channel, which extends through the casing (6) and is shielded from the inner space of the casing.

14 Claims, 2 Drawing Sheets

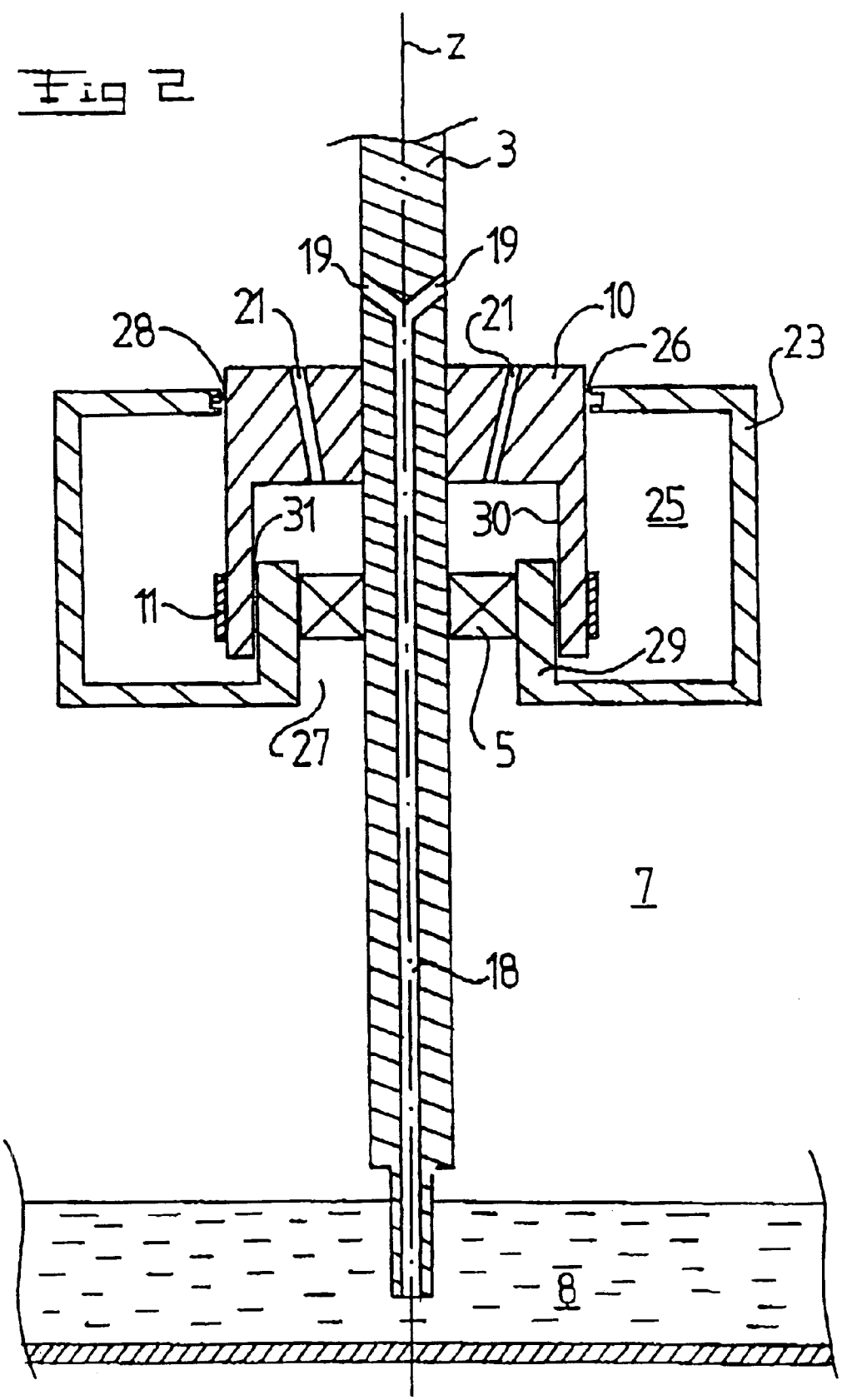

DRIVE UNIT FOR CENTRIFUGE ROTOR OF A CENTRIFUGAL SEPARATOR

FIELD OF THE PRESENT INVENTION

The present invention refers to a drive unit for a centrifuge rotor of a centrifugal separator, wherein the drive unit includes a drive shaft, which is arranged to carry said centrifuge rotor and is rotatably journalled in at least one bearing member, and a casing, which delimits an upper space, in which the drive shaft and said first bearing member are located, and a lower space for storing liquid oil, and wherein the drive unit includes first means, which are arranged to create a flow of air and said oil for forming an oil mist and to bring this oil mist to flow through said bearing member for cooling and lubricating thereof.

BACKGROUND OF THE PRESENT INVENTION

The cooling of bearings of known drive units for centrifugal separators frequently rely on an internal circulating air stream, to which are supplied droplets of oil from an oil pan in a lower space in the drive unit in such a way that an oil mist is formed. The air stream with the oil mist is circulated through the bearings by means of a fan or similar member, and absorbs the heat formed in the bearing while at the same time lubricating the bearing. The air stream with the oil mist is further circulated after passing through the bearing in the inner space defined by the casing of the drive unit, wherein the heat absorbed by the oil droplets and the air is conducted away to other parts of the drive unit. A part of the oil droplets are thereby deposited onto the surfaces of the parts along which the oil flows down to the oil pan where it is collected. In the centrifugal separators now available, the heat release from the air stream to the separator walls is however not particularly efficient. U.S. Pat. No. 4,541,736 discloses a drive unit for a centrifuge rotor of a centrifugal separator. The known device is arranged to feed oil droplets in a stagnant air atmosphere through the bearing members carrying the rotor spindle.

SUMMARY OF THE INVENTION

The object of the present invention is to overcome the problems mentioned above and to improve the efficiency of the bearing cooling in a centrifugal separator.

This object is obtained by the drive unit initially defined, which is characterised by means, arranged to cool said oil mist by permitting transportation of a substantial part of said oil mist from an outlet of the bearing member through at least a passage extending in heat transferring contact with a surrounding space outside the casing to the lower space. By such an arrangement, an efficient heat release is obtained from the oil mist, which has flown through the bearing, i.e. the cooling of the oil is improved in comparison with the corresponding cooling of previously known centrifugal separators. Since the oil mist, upon presentations to the bearing has a relatively low temperature, an efficient bearing cooling may be obtained by a relatively small flow of the oil mist through the bearing.

According to an embodiment of the invention, said passage extends from an upper part of the upper space defined by the casing to a lower part of the upper space. Since the passage extends along a large part of the upper, free space, i.e. the space above the liquid oil, it is possible to ensure an efficient cooling of the oil mist. Thereby, said passage may extend along a substantial part of the length of the casing.

According to a further embodiment of the invention, said passage is formed at least partly by a wall member, which is in heat transferring contact with a surrounding space outside the casing. Such a wall member may be formed by the wall of the casing, i.e. said passage extends directly inside the casing or through channels in the wall of the casing. However, the passage may be formed in many different ways according to the present invention. For instance, the wall member may be formed conduits, which extend substantially outside the casing, wherein the oil is guided into the conduit through a passage in the casing at an upper part of the upper space and out from the conduit through a passage through the casing at a lower part of the upper space, i.e. immediately above the oil in the lower space.

According to a further embodiment of the invention, said second means include a first shielding member which extends outwardly from the bearing member in a direction towards an inner wall of the casing. In such a way the oil is forced away from the bearing and outwardly towards the relatively cold casing. Furthermore, said second means may advantageously include a second shielding member, which extends between the drive shaft and an inner wall of the casing for forming said passage. By such a shielding member a passage between the relatively cold casing and the shielding member is obtained. The second shielding member may extend substantially axially downwardly from a radially outer edge of the first shielding member. Furthermore, the second shielding member may extend so far downwardly that a gap is formed between a lower edge of the second shielding member and the liquid oil in the lower space. In such a way an efficient cooling of the oil is ensured and, moreover, a not insignificant part of the oil will be collected in the liquid oil in the lower space. The second shielding member may also extend at least partway around the drive shaft. In such a way, substantially the whole wall of the casing towards the surrounding space may be utilised as a cooling surface for the oil.

According to a further embodiment of the invention, the drive unit includes surface increasing members, for instance in the form of projecting flanges or the like, which are provided in said passage in order to increase the heat transfer from the oil, and/or surface increasing members, for instance in the form of projecting flanges or the like which are provided on the outer side of the casing up towards said surrounding space in order to increase the heat release to said surrounding space.

According to a further embodiment of the invention, said first means include a fan member which is arranged to drive one of said flow of air and oil through the bearing member and said passage. Thereby, heat from the bearing member will be transferred to the surrounding space via the air and the oil. Advantageously, the fan member is fixedly provided on the drive shaft.

BRIEF DESCRIPTION OF THE DRAWINGS

The present invention is now to be explained more closely by a description of an embodiment and with reference to the drawings attached, in which FIG. 1 discloses schematically a partly sectional perspective view of a drive unit for a centrifuge rotor of a centrifugal separator, and FIG. 2 discloses a sectional view through a lower part of the drive unit in FIG. 1.

DETAILED DESCRIPTION OF DIFFERENT EMBODIMENTS OF THE INVENTION

Figure 1:
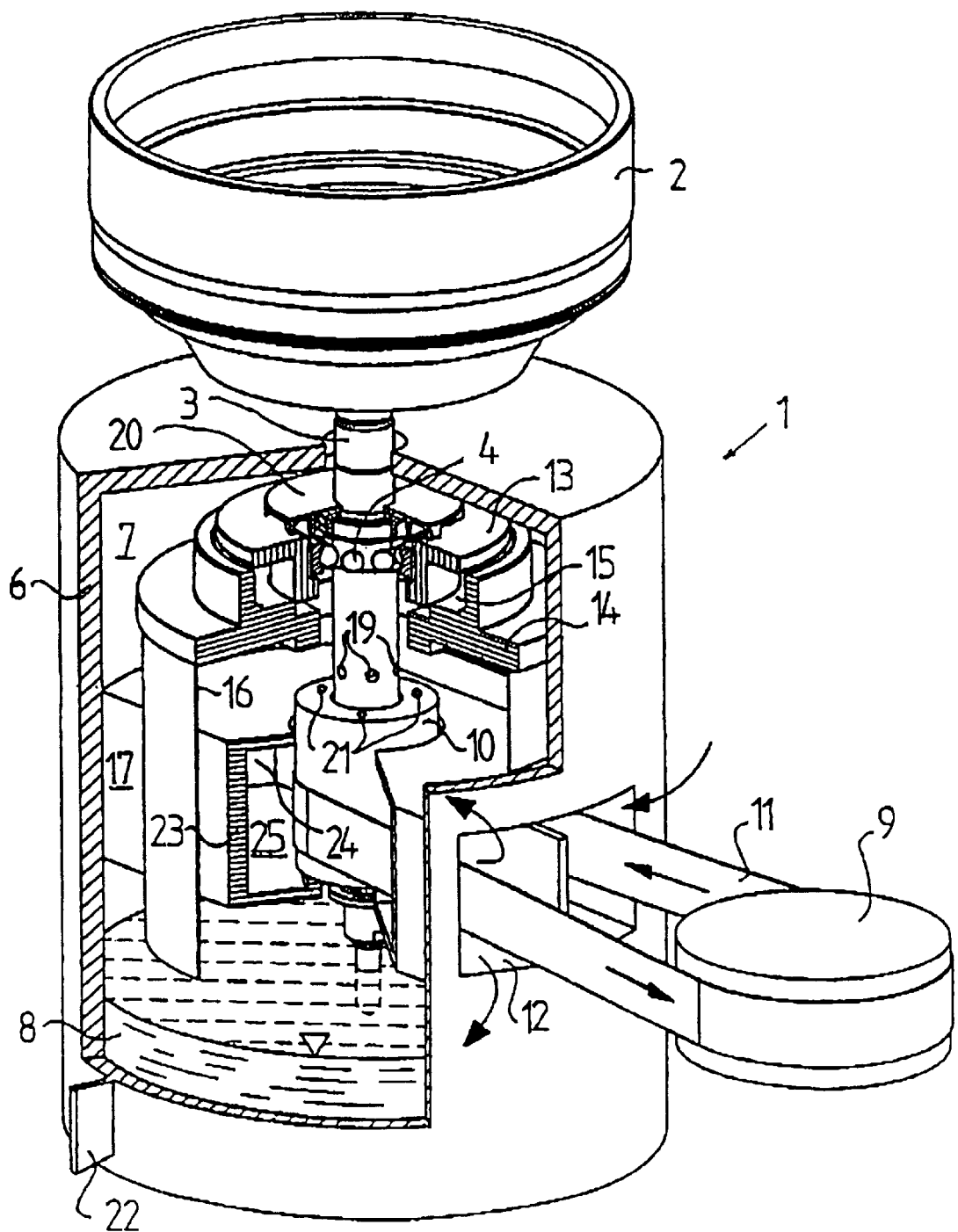

FIG. 1 discloses a drive unit 1 for a partly disclosed centrifuge rotor 2. The drive unit 1 and the centrifuge rotor 2 form together substantial components of a centrifugal separator.

The drive unit 1 includes a drive shaft 3, which supports the centrifuge rotor 2 and is rotatable around a rotary axis z and carried by means of a first, upper bearing member 4 and a second, lower bearing member 5, see FIG. 2. Furthermore, the drive unit 1 includes a casing 6, which delimits an inner space. The inner space consists of an upper space 7, in which the drive shaft 3, the first bearing member 4, and the second bearing member 5 are located, as well as a lower space 8, which is designed as an oil pan and arranged to store a quantity of liquid oil. The drive unit 1 also includes a drive motor (not disclosed) which is connected to a belt pulley 9. The drive motor and the belt pulley 9 are provided outside the casing 6 and connected to a belt pulley 10, which is fixedly provided on the drive shaft 3 by means of a transferring member in the form of a drive belt 11, which extends through a passage 12 in the casing 6. It is to be noted that the drive belt 11 may be replaced by a drive rod which, via two gears are in driving engagement with the drive motor and the drive shaft 3.

The upper bearing member 4, the so-called neck bearing, is carried by means of a bearing housing 13. The bearing housing 13 is connected to a first shielding member 14 which includes at least one shielding portion, which extends outwardly, preferably substantially radially outwardly, from the upper bearing member 4 in a direction towards an inner wall of the casing 6. The bearing housing 13 and the shielding member 14 are, in the example disclosed, designed to form a space 15, which is intended to receive dampening elements (not disclosed) known per se. The upper bearing member 4 is connected to the casing 6 via the bearing housing 13, said dampening elements and the first shielding member 14.

A second shielding member 16 extends substantially axially downwardly from a radially outer edge of the first shielding member 14 between the drive shaft 3 and an inner wall of the casing 6 in such a way that an annular passage 17 is formed therebetween. The second shielding member 16 extends in the example disclosed around the drive shaft 3 and so far downwardly that a relatively thin gap is formed between a lower edge of the second shielding member 16 and the oil in the lower space 8.

In the example disclosed, the drive shaft 3, see FIG. 2, extends through the upper space 7 and downwardly into the oil in the lower space 8. Furthermore, the drive shaft 3 includes an inner channel 18, which has at least one orifice in the lower space 8 and a plurality of orifices 19 in the upper space 7 above the belt pulley 10 but below the upper bearing member 4. The drive shaft 3 is designed in such a way that oil is transported through the inner channel 18 during operation of the centrifugal separator and forms small oil droplets at least at the exit of the oil from the upper orifices 19.

Furthermore, the drive unit 1 includes a fan wheel 20 which is fixedly arranged on the drive shaft 3, in the example disclosed above the upper bearing member 4. The fan wheel 20 is arranged to force a flow of air and oil droplets, which form an oil mist flowing through the upper bearing member 4 for cooling and lubricating thereof. Furthermore, the fan wheel 20 is arranged to force said flow from the upper bearing member 4 radially outwardly in a direction towards the inner wall of the casing 6 and axially downwardly through the passage 17 between the inner wall of the casing 6 and the second shielding member 16 to a position just above the oil in the lower space 8, i.e. to said gap between the second shielding member 16 and the oil in the lower space 8. A part of the oil, which is present in said flow, will thereby be collected by the oil in the lower space 8 and a part of the oil will be transported further together with the air stream upwardly through the lower bearing member 5 in such a manner that also the latter is cooled and lubricated, which is described more closely below. From an outlet of the lower bearing member 5, the oil mist is transported further through a number of channels 21, which extend through the belt pulley 10, up to an inlet of the upper bearing member 4. An air stream containing oil droplets will thus be circulated as an oil mist in a path in the inner space 7, 8 defined by the casing 6, which path extends through the two bearing members 4, 5 and the passage 17 where the oil mist its heat and is cooled by contacting the inner wall of the casing 6. In order to increase the cooling of the oil mist, flanges 22 or similar surface-increasing members may be provided on the outer wall of the casing 6. FIG. 1 discloses as an example merely one such flange 22. Such flanges (not disclosed) or similar surface-increasing members may also be provided on the inner wall of the casing 6 and/or on the second shielding member 16.

It is to be noted that the passage 17 may be realized in many different manners. For instance, the passage may be formed by conduits, which extend substantially vertically outside the casing 6 by means of openings in the upper and lower parts of the casing 6. Such conduits exteriorly located may be cooled in an efficient manner by the air of the surrounding space. The passage may also be formed by channels, which extend substantially vertically in the wall of the casing 6 from an upper of the casing 6 to a lower part thereof. In these embodiments, the second axial shielding member 16 may be dispensed with. The passage 6 may also be designed as a number of separate channels extending substantially vertically inside the inner wall of the casing 6. In such an embodiment, the second shielding member 16 may be formed by a plurality of shielding members, for instance a separate shielding member for each such separate channel.

Furthermore, the drive unit 1 includes a separating member 23, which is provided inside the casing 6 and which is arranged to house the part of the drive belt 11 which extends inside the casing 6 in such a way that the drive belt 11 is separated from the inner space 7, 8 of the casing 6. The separating member 23 is connected to the inner wall of the casing 6 at two diametrically opposed sides by means of a respective connection which extends around the passage 12 mentioned above and a diametrically opposite passage 24. Consequently, the separating member 23 forms a channel 25 which extends substantially diametrically through the inner space 7, 8 of the casing 6 with respect to the axis z of rotation and which is separated from this space 7, 8. Furthermore, the separating member 23 has an elongated, box-like shape, i.e. it is substantially rectangular seen in the cross-sectional view disclosed in FIG. 2, and includes an upper delimiting wall and a lower delimiting wall, which are substantially parallel to each other, and two substantially parallel lateral limiting walls. It is to be noted that the separating member 23 also may have another cross-sectional shape than a rectangular one. It may, for instance, be oval.

Furthermore, the separating member 23 includes an upper opening 26, which extends through the upper delimiting wall, and a lower opening 27, which extends through the lower delimiting wall. The drive shaft 3 extends through the separating member 23 through these openings 26, 27, wherein the upper opening 26 also is arranged to receive an upper part of the belt pulley 10. As indicated in FIG. 2, a gap seal 28, for instance a labyrinth seal, is provided between the belt pulley 10 and the upper delimiting wall of the separating member 23. The lower delimiting wall of the separating member 23 includes a circular cylindrical portion 29, which forms the lower opening 27. The circular cylindrical portion 29 carries, such as appears from FIG. 2, the lower bearing member 5. Furthermore, the circular cylindrical portion 29 extends into a circular cylindrical recess 30 of the belt pulley 10. Between the outer surface of the circular cylindrical portion 29 and the inner surface of the circular cylindrical recess 30 a gap seal 31 is provided. Furthermore, as appears from FIG. 2, the drive belt 11 abuts the belt pulley 10 substantially radially outside the lower bearing member 5.

The circulating air stream with the oil mist may thus pass through the separating member 23 via the lower opening 27, through the lower bearing member 5 and out through the channels 21 of the upper part of the belt pulley 10. The air stream with the oil mist may however not pass into the channel 25, which is defined by the separating member 23 thanks to the seal arrangements 28 and 31. However, an air stream from the air of the surrounding space of the drive unit 1 may pass through the passages 12 and 24 and the channel 25. In such a manner, further cooling of the oil mist may be obtained and at the same time, the cooling of the lower bearing member 5 may be improved.

The drive belt 11 will thereby act as a pump member and contribute to force such an air stream through the channel 25. The part of the drive belt 11 which runs inwardly in the channel 25 will thereby force an air stream into the channel 25 and the part of the drive belt 11 which runs outwardly in the channel 25 will force an air stream out of the channel 25. In order to improve the air flow through the channel 25, a wall member 32 is provided substantially centrally in the channel 25 in such a way that the channel 25 is divided into two partial channels. The wall member 32 extends in a substantially axial and radial plane with respect to the rotary axis z from an area in the proximity of the belt pulley 10 to an area in the proximity of the passage 12. The drive belt 11 thus runs inwardly in one partial channel and outwardly in the other partial channel.

It is to be noted that the channel 25 does not necessarily need to extend transversely through the inner space 7, 8 defined by the casing 6, i.e. merely one of the passages 12 and 24 is necessary. It is also possible to increase the cooling effect via the separating member 23 by means of a fan member, which is arranged to increase the air flow through the channel 25. Furthermore, also the separating member 23 may be provided with flanges or similar surface-increasing members, which extend into the channel 25 and/or into the inner space 7, 8 defined by the casing 6.

The present invention is not limited to the embodiment disclosed but may be varied and modified within the scope of the following claims. Within the scope of the invention, it is possible to transport the oil by means of pressurizing instead of by means of the fan wheel 20 disclosed. Thereby, the oil will be forced through the bearing members 4, 5 and thereafter flow along surfaces in the drive unit 1 back to the lower space 8.

What is claimed is:

1. A centrifugal separator comprising a centrifuge rotor (2) and a drive unit (1) for the centrifuge rotor (2), said drive unit (1) comprising a drive shaft (3) arranged to carry said centrifuge rotor (2) and rotatably journalled in at least one bearing member (4) about a substantially vertical axis (z), a casing (6) which delimits an upper space (7) in which the drive shaft (3) and said bearing member (4) are located, a lower space (8) for storing oil, first means (18, 19, 20) arranged to create a flow of air acting with said oil to form an oil mist and to bring this oil mist to flow through said bearing member (4) for cooling and lubricating thereof, and second means (14, 16, 17) arranged to cool said oil mist by transporting a substantial part of said oil mist from an outlet of said bearing member (4) through at least one passage (17) extending in heat transferring contact with a surrounding space outside the casing (6) to the lower space (8).

2. A centrifugal separator according to claim 1, wherein said passage (17) extends from an upper part of the upper space (7) to a lower part of the upper space (7).

3. A centrifugal separator according to claim 1, wherein said passage (17) extends along a substantial part of the substantially vertical length of the casing (6).

4. A centrifugal separator according to claim 1, wherein said passage (17) is formed at least partly by a wall member, which is in heat transferring contact with a surrounding space outside the casing (6).

5. A centrifugal separator according to claim 4, wherein said wall member is formed by the casing (6).

6. A centrifugal separator according to claim 1, wherein said second means includes a first shielding member (14) which extends outwardly from said bearing member (4) in a direction towards an inner side of the casing (6).

7. A centrifugal separator according to claim 6, wherein said second means includes a second shielding member (16) which extends between the drive shaft (3) and an inner side of the casing (6) in order to delimit said passage (17).

8. A centrifugal separator according to claim 7, wherein said second shielding member (16) extends substantially axially downwardly from a radially outer edge of the first shielding member (14).

9. A centrifugal separator according to claim 8, wherein the second shielding member (16) extends so far downwardly that a gap is formed between a lower edge of the second shielding member (16) and the oil in the lower space (8).

10. A centrifugal separator according to claim 7, wherein the second shielding member (16) extends at least partway around the drive shaft (3).

11. A centrifugal separator according to claim 1, said drive unit further comprising surface increasing members which are provided in said passage (17) in order to increase the heat transfer from the oil.

12. A centrifugal separator according to claim 1, said drive unit further comprising surface increasing members (22) which are provided on the outer side of the casing (6) towards said surrounding space.

13. A centrifugal separator according to claim 1, wherein said first means includes a fan member (20) which is arranged to drive said flow of air and oil through said bearing member (4, 5) and said passage (17).

14. A centrifugal separator according to claim 13, wherein the fan member (20) is fixedly provided on the drive shaft (3).

* * * * *